R. C. BENNER.
ELECTRIC BATTERY.
APPLICATION FILED FEB. 7, 1916.
1,276,714.
Patented Aug. 27, 1918.
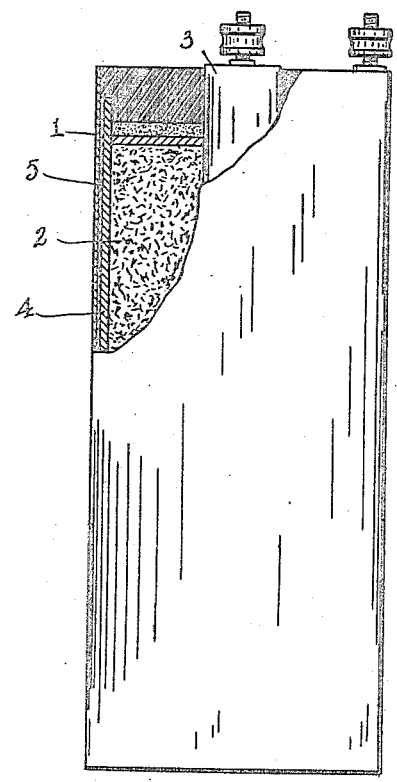
INVENTOR.
R. C. BENNER
BY L. J. Adams,
ATTORNEY

UNITED STATES PATENT OFFICE.

RAYMOND C. BENNER, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

1,276,714. Specification of Letters Patent. Patented Aug. 27, 1918.

Application filed February 7, 1916. Serial No. 76,533.

*To all whom it may concern:*

Be it known that I, RAYMOND C. BENNER, a citizen of the United States, residing at Fremont, in the county of Sandusky and State of Ohio, have invented a certain new and useful Improvement in Electric Batteries, of which the following is a full, clear, and exact description.

This invention relates to electric batteries and more particularly to that type known commercially as "dry cells".

The single figure of the drawing illustrates a dry cell embodying my improvement.

A dry cell is usually made by tamping a mix around a carbon electrode in a zinc can from which the mix is separated by a paper or other bibulous lining. It is also customary to smear or otherwise apply flour paste to such lining, but in the bag type of cell the flour paste is poured in between the depolarizing cartridge and the zinc without any paper lining.

Since the electrolyte is always in contact with the zinc electrode, the latter is always subject to corrosion, regardless of whether the battery is in use or not. Consequently if the cell is stored for any length of time before being used, the zincs are more or less corroded and the resistance is increased by crystallization of basic salts on the zinc electrode, both of which contribute to the shortening of the service life.

My invention aims to overcome this defect by incorporating in the cell a material that substantially prevents corrosion of the zinc electrode except when the battery circuit is closed. I have found that if potassium bichromate is added to a cell it will protect the same from corrosion on open circuit, but when the circuit is closed the zinc will be acted upon by the electrolyte in the usual way.

This material is preferably added to the paste of the cell in amounts varying from a fraction of a gram to ten grams in the usual six-inch type. In such a cell there is about 14 grams of flour paste, and by mixing ¼ gram of bichromate in the paste the service life of the cell is increased about 12% and the corrosion of the zinc during storage is decreased about 32%. These percentages are increased by adding a greater quantity of potassium bichromate and when 10 grams of this are used the service life is increased about 57% and the zinc corrosion decreased substantially 81% on storage. I have preferred to use about 10 grams per cell, although greater amounts of course could be used if desired.

While I have found that either potassium or sodium bichromate can be used to produce the desired result, it is not necessary to restrict the invention to the use of these materials, as chromic acid and bichromates of zinc and other metals could be used to advantage. Chromates of sodium and potassium also would produce the desired results and in fact, I believe that one could use any oxygen compound containing hexavalent chromium with similar results. Therefore all of these must be regarded as equivalents although the range of equivalents is not to be limited to the materials specified.

While I have stated the preferred way of incorporating chromium material into the dry cell, it will be apparent that it could be incorporated therein in other ways.

Referring to the single figure of the drawing, the zinc can 1 contains a mix 2 packed around a carbon electrode 3, the zinc being separated from the mix by a bibulous lining 4 which has a coating 5 of the paste referred to.

I am aware that chromates and bichromates have been used as depolarizers in electric batteries, such as the Grenet cell and others, but the action in these cells is entirely different. While I am certain that the beneficial action in my depolarizer is not due to the depolarizing action of the bichromates, I am not absolutely sure of the real reason for such action. However, it would seem that the beneficial effect is due to the formation of an insoluble insulating precipitate on the zinc electrode, which is of the nature of the chromium hydroxid, zinc chromate, basic zinc chromate or chromate of some other metal, depending upon what particular chromate is used. This insulation apparently is high enough to prevent corrosion of the zinc on open circuit, but when the circuit is closed it permits the normal action of the battery. However, regardless of any theory of operation, my experiments have proven that the service life of cells is very materially increased on telephone service or on any other service in which shelf life is an important factor.

Having described my invention, what I claim is:—

1. In dry cells, a zinc can containing electrolyte mix and a layer of chromium precipitate on said zinc adapted to reduce corrosion thereof.

2. In dry cells, zinc and carbon electrodes, an electrolyte therebetween, and a paste adjacent said zinc electrode containing an alkaline bichromate.

3. In dry cells, zinc and carbon electrodes, an electrolyte therebetween, and a paste adjacent said zinc electrode containing potassium bichromate.

In testimony whereof, I hereunto affix my signature.

RAYMOND C. BENNER.